Jan. 24, 1933.   S. FISCHER, JR   1,895,154
METHOD FOR MEASURING OILINESS OF SUBSTANCES
Filed Nov. 4, 1929
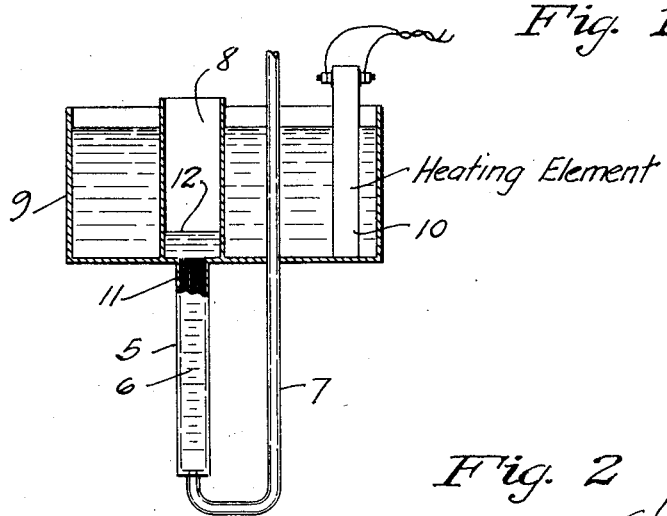
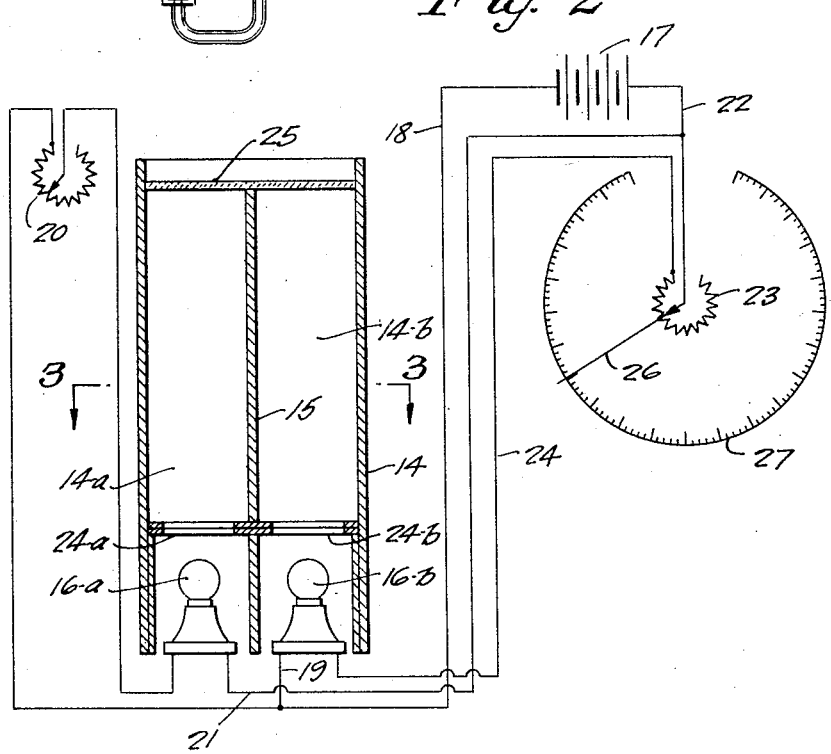
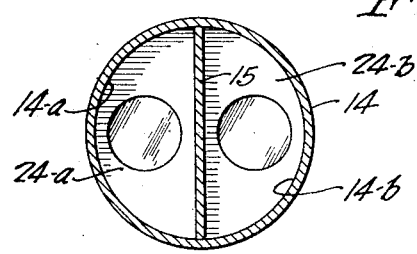
INVENTOR
Siegfried Fischer, Jr.
BY Westall and Wallace
ATTORNEYS Patented Jan. 24, 1933

1,895,154

UNITED STATES PATENT OFFICE

SIEGFRIED FISCHER, JR., OF LOS ANGELES, CALIFORNIA

METHOD FOR MEASURING OILINESS OF SUBSTANCES

Application filed November 4, 1929. Serial No. 404,823.

This invention relates to a method of measuring the oiliness of substances such as oils, greases, waxes, solid hydrocarbon and the like. I have discovered that oiliness of unctuous substances is proportional to the penetrating qualities of such liquids into mediums permeable to liquids. I have also discovered that the translucency of absorbent mediums is proportional to the penetration by such unctuous substances.

The present invention relates to a method of determining the oiliness of unctuous substances by directly or indirectly measuring the penetration of such substances into an absorbent medium. This may be accomplished by comparison of the penetration of a substance to be tested with the penetration of a standard unctuous liquid. The objects of this invention are to provide a method to effect the above mentioned steps.

The objects of this invention may be accomplished by means of the instrumentalities shown herein. These instrumentalities are disclosed for illustrative purposes only and the invention is in no way limited to their use.

Referring to the drawing: Fig. 1 is a diagrammatic side view partly elevational and partly sectional of apparatus for directly determining penetration of an oily liquid; Fig. 2 is a diagrammatic side view in section including a wiring diagram, all for determining the oiliness by translucency; and Fig. 3 is a section as seen on the line 3—3 of Fig. 2.

I have observed that, if various oils or liquids containing oily substances in solution are applied in identical amount to suitable absorbent media, that such oils or liquids will penetrate these media to a greater or lesser extent. This difference in penetration may be observed with the naked eye, by the difference in light which may be cast through the samples. Fig. 1 illustrates means for determining penetration by direct observation. Referring more particularly to Fig. 1 a transparent cylindrical magazine is marked 5. This magazine may be of glass and is provided with graduations 6 marked thereon for reading the depth of penetration of a liquid into an absorbent cartridge inserted in the magazine. The magazine has a bent relief tube 7 extending therefrom. The upper end of the magazine is enlarged to form a reservoir 8 and surrounded by a basin 9 for containing a bath of water or like liquid which may be heated in any suitable manner as by electrical heating elements indicated generally by 10.

A cartridge 11 of an absorbent medium such as a blotting or filter paper composition is inserted in the magazine. Duplicate cartridges are provided to be used for the various liquids to be measured. The oil to be measured 12 is introduced into the reservoir 8, a predetermined quantity being used. The oil is allowed to penetrate the cartridge and the depth of penetration measured by aid of graduations 6. A standard depth of penetration may be selected for comparison, or relative depths of penetration by test liquids all of identical amount may be compared. However, I prefer to establish a standard depth by using castor oil as the standard and measuring its penetration depth. It may be advisable to introduce the oils at the same fluidity. To this end a Saybolt viscosimeter may be used and the temperature determined at which castor oil has the same fluidity as the test oil and tests conducted with the castor or standard oil initially of the temperature to produce the same fluidity as the test oil. The methods of determining the relation between temperature and fluidity is well known.

Another method of avoiding error due to difference of fluidity and viscosity and to introduce oily substances of appreciable solidity is to dilute the oils or dissolve the substances with a volatile diluent, preferably one of high volatility, such as ether. Like quantities of the standard and test substances are dissolved in ether and introduced into the reservoir In this instance the bath is heated to evaporate the diluent and leave the residue of oil in the cartridge I have found that 5 cc. of castor oil with 95 cc. of ether and 5 cc. of test oil with 95 cc. of ether produce satisfactory results. The castor oil will show greater penetration of the cartridge than the test oil and a markedly greater light transmission. The ether having been evaporated only the oily substance base remains as a residue and as both samples have been treated identically the same and are diluted or dissolved to the same extent with a large ratio of dilution, viscosity can have no appreciable effect.

An instrument which I have termed an unctuometer is shown in Figs. 2 and 3. This instrument is one of a variety of photometer type adapted to measuring the translucencies of test samples. Referring to the drawing, a dark box of tubular form is marked 14. A longitudinally extending partition 15 divides the box into wells 14a and 14b. In each well at the base of the box are duplicate electric lamps 16a and 16b. A source of electrical energy such as a battery of cells is denoted by 17. Leading from one terminal of the battery is a conductor 18 connected by a branch conductor 19 to lamp 16b and by another branch conductor to an adjustable rheostat 20. The other terminal of rheostat 20 leads to one terminal of lamp 16a so that its candle power may be adjusted. Lamp 16a is connected by a branch conductor 21 to a conductor 22 leading to the other terminal of battery 17. Connected to conductor 22 is one terminal of an adjustable rheostat 23 for lamp 16b. The other terminal of rheostat 23 is connected by a conductor 24 to lamp 16b. Rheostat 20 is intended to be initially adjusted and rheostat 23 manipulated during a test. In well 14a is a shelf 24a to support a test sample and well 14b has a like shelf 24b, there being openings at the center of said shelves. A frosted glass serving as a sight is marked 25. Light from the lamps may be projected through the samples and observed on the glass 25. Obviously suitable switches may be included, if desired, for controlling the lamps.

Disks of filter paper or like absorbent media are preferably used. The disks are duplicates in dimensions and material. As illustrative of a specific operation, a disk is treated with two drops of a solution of 5 cc. of castor oil and 95 cc. of ether, and the ether allowed to evaporate leaving the oil base as a residue. This sample constitutes the standard. A duplicate disk is then treated with two drops of a solution of 5 cc. of the oil to be tested and 95 cc. of ether. The ether is allowed to evaporate and the latter disk constitutes the test sample. The lamps 16a and 16b are lighted. Rheostat 20 is set to give about one-half of its normal light intensity. Two duplicate disks which have not been treated with oil are placed in the wells over the shelves 24a and 24b. The fields of light on the sight glass 25 are then observed and rheostat 23 manipulated until both fields are of the same intensity. It may be that the oily substance on the disks is not a single spot, but a multiplicity of spots distributed over the disk area. It may also occur that the depth of penetration of some of the spots is greater than others. However, the total light transmitted through a disk is proportional to the oiliness as compared with the total light transmitted through a disk having an identical amount of a standard oily base substance. It is the summation of the light transmitted through a disk that is to be considered. The frosted glass does not register an image of a spot or of spots but a field of light. Care should be taken that all the oily spots or all of a spot should be in the path of the light. There should be no interception of the light except by the oily parts of the disks. All of the oily base area remaining on a disk must be in the path of the light transmitted. Rheostat 23 has an arm 26 operating over a graduated scale 27. A reading is then taken on scale 27. The untreated disk on shelf 24b is replaced with the standard sample disk. Rheostat 23 is again manipulated to produce in the sight glass fields of the same light intensity. A reading is then taken on scale 27. The standard sample is replaced by the test sample, the rheostat 23 adjusted to produce fields on the sight glass of the same intensity. There are three readings, one for the untreated disk which may be designated A, one for the standard sample designated B and one for the test sample designated C. If C lies intermediate A and B, then the oiliness of the sample is less than 100 per cent using castor oil as a standard or 100 per cent. If C falls outside of B then the oiliness of the sample is greater. By calibrating the rheostat in degrees of light intensity the readings may be evaluated in degrees of oiliness with castor oil as a unit.

Photometric devices may be used in which the light intensities of fields may be varied by adjusting the distance between the samples and the lights such as by moving the lights or the samples. Types of photometers of this character are well known. The photometric device shown is illustrative of the broad idea only, as Bunsen photometers, flicker photometers or any other photometric instrument capable of measuring light intensities may be employed.

While in the specific operation described dilution of the oily substances was made use of, I do not limit myself to such step or any particular dilution. Undiluted oils may be used. Whereas, both penetration and translucency have been described, either one is broadly within the scope of my invention. Furthermore any absorbent medium may be used.

When very dark oil is used in diluted, or oily substances in undiluted form it may be advisable to compensate for color. This may be done by placing standardized color slips between the light source and sight glass. As illustrative of the effect of color experiments were conducted as follows: 5 cc. of molasses was diluted in 95 cc. of water and compared with oil samples diluted with ether in the same amount, and the molasses sample was opaque. Color has no effect when not too dark as tests were conducted with the following samples: a heavy dark brown, paraffin base Pennsylvania lubricating oil; dark colored 750 viscosity acid treated Western oil; reddish brown, 750 viscosity; Edleanu treated Western oil; light yellow lard oil; light yellow oleic acid; colorless glycerine and others. These tests showed more light transmitting quality for darker Pennsylvania oil than did the lighter colored Edleanu treated Western oil. This is in accordance with lubrication practice experience, namely that Pennsylvania oil has greater oiliness and life than Western oil. Both oils showed less light transmission than castor oil. Color had no appreciable effect as the other samples showed light transmitting qualities in the following order: Oleic acid, castor oil, Pennsylvania oil, Edleanu treated Western oil, Western acid treated oil. When color is too dark, the degree of fluidity of a test and standard sample too great, or the difference in viscosities large, standardization may be resorted to as above outlined.

What I claim is:—

1. The method of determining unctuousness of oily substances which comprises introducing a standard unctuous substance into a porous medium permeable to oily substances, introducing a test oily substance to be measured into a duplicate medium and making perceptible the partial penetration of said standard and said test substances in said media for comparison.

2. The method of determining unctuousness of oily substances which comprises introducing a predetermined amount of a standard unctuous substance into a porous medium permeable to oily substances; introducing an identical amount of a test oily substance to be measured into a duplicate medium; and making perceptible the partial penetration of said standard and test substances in said media for comparison.

3. The method of determining unctuousness of oily substances which comprises dissolving a test oily substance to be measured in a volatile liquid, introducing the solution into a porous medium permeable to oily substances, evaporating the diluent and making perceptible the amount of partial penetration of the residue of said oily substance into said medium for comparison.

4. The method of determining unctuousness of oily substances which comprises dissolving a standard oily substance in a volatile liquid, introducing the solution of said standard oily substance into a porous medium permeable to oily substances, evaporating the solvent; dissolving a test oily substance to be measured in a volatile liquid, introducing test solution into a duplicate medium, evaporating the solvent; and making perceptible the partial penetration of the residue of said standard solution and the residue of said test solution in said media for comparison.

5. The method of determining unctuousness of oily substances which comprises dissolving a predetermined amount of a standard oily substance in a volatile liquid, introducing the standard solution into a porous medium permeable to oily substances; evaporating the solvent; dissolving an identical amount of a test oily substance to be measured in a volatile liquid, introducing the test solution into a duplicate medium, evaporating the solvent; and making perceptible the partial penetration of the residue of said standard solution and the residue of said test solution in said media for comparison.

6. The method of determining the unctuousness of oily substances which comprises dissolving a standard oily substance in a volatile liquid of a low degree of viscosity, introducing the standard solution into a porous medium permeable to oily substances, evaporating the solvent; dissolving a test oily substance to be measured in a volatile liquid of a low degree of viscosity, introducing the test solution to be measured into a duplicate medium, evaporating the solvent; and making perceptible the partial penetration of the residue of said standard solution and the residue of said test solution in said media for comparison.

7. The method of determining the unctuousness of oily substances which comprises dissolving a predetermined amount of a standard oily substance in a volatile liquid of a low degree of viscosity, introducing the standard solution into a porous medium permeable to oily substances, evaporating the solvent; dissolving an identical amount of a test oily substance to be measured in a volatile liquid of a low degree of viscosity; introducing the test solution into a duplicate medium, evaporating the solvent; and making perceptible the partial penetration of the residue of said standard solution and the residue of said test solution in said media for comparison.

8. The method of determining the unctuousness of oily substances which comprises establishing the same fluidity in a standard oily substance and a test oily substance to be measured, introducing the standard oily substance into a porous medium permeable to oily substances, introducing a test oily substance into a duplicate medium and making perceptible the partial penetration of said standard oily substance and said test oily substance in said media for comparison.

9. The method of determining the unctuousness of oily substances which comprises establishing the same fluidity in a standard oily substance and a test oily substance to be measured, introducing a predetermined amount of a standard oily substance into a porous medium permeable to oily substances, introducing an identical amount of a test oily substance to be measured into a duplicate medium and making perceptible the partial penetration of said standard oily substance and said test oily substance in said media for comparison.

10. The method of determining the unctuousness of oily substances which comprises treating a standard oily substance to produce the same fluidity as a test oily substance to be measured, introducing the standard oily substance into a porous medium permeable to oily substances, introducing the test oily substance to be measured into a duplicate medium and making perceptible the partial penetration of said standard oily substance and said test oily substance in said media.

11. The method of determining the unctuousness of oily substances which comprises treating a standard oily substance to produce the same fluidity as a test oily substance to be measured, introducing a predetermined amount of the standard oily substance into a porous medium permeable to oily substances, introducing an identical amount of a test oily substance to be measured into a duplicate medium, and making perceptible the partial penetration of said standard and said test oily substances in said media.

12. The method of determining the unctuousness of oily substances which comprises partially penetrating with a standard oily substance a sheet of absorbent medium, partially penetrating with a test oily substance to be measured a duplicate sheet of absorbent porous medium, and photometrically measuring the translucencies of the penetrated media.

13. The method of determining the unctuousness of oily substances which comprises partially penetrating with a predetermined amount of a standard oily substance a sheet of absorbent medium, partially penetrating with an identical amount of a test oily substance to be measured a duplicate sheet of absorbent medium, and photometrically transmitting light through the sheets for the translucencies of the penetrated media.

14. The method of determining the unctuousness of oily substances which comprises dissolving a standard oily substance in a volatile liquid, partially penetrating with the solution a sheet of absorbent medium, dissolving a test oily substance to be measured in a volatile liquid, partially penetrating with the test solution an identical sheet of absorbent medium, and photometrically transmitting light through the sheets for the translucencies of the penetrated media.

15. The method of determining the unctuousness of oily substances which comprises dissolving a predetermined amount of a standard oily substance in a volatile liquid, partially penetrating with the standard solution a sheet of absorbent medium; dissolving an identical amount of test oily substance to be measured in a volatile liquid, partially penetrating with the test solution a duplicate sheet of absorbent medium, and photometrically transmitting light through the sheets for the translucencies of the penetrated media.

16. The method of determining unctuousness of oily substances which comprises dissolving a standard oily substance in a volatile liquid, introducing the standard solution into a porous medium permeable to oily substances, evaporating the solvent and thereby leaving the medium partially penetrated by the standard oily substance; dissolving a test oily substance to be measured in a volatile liquid, introducing the test solution into a duplicate medium, evaporating the solvent and thereby leaving the medium partially penetrated by the test oily substance; and transmitting light through the media for photometrically measuring the comparative translucencies of the media.

17. The method of determining unctuousness of oily substances which comprises dissolving a predetermined amount of a standard oily substance in a volatile liquid, introducing the standard solution into a porous medium permeable to oily substances evaporating the solvent and thereby leaving the medium partially penetrated by the standard oily substance; dissolving an identical amount of a test oily substance to be measured in a volatile liquid, introducing the test solution into a duplicate medium, evaporating the solvent and thereby leaving the medium partially penetrated by the test oily substance; and transmitting light through the medium for photometrically measuring the comparative translucencies of the media.

18. The method of determining the unctuousness of oily substances which comprises dissolving a standard oily substance in a volatile liquid of a low degree of viscosity, introducing the standard solution into a porous medium permeable to oily substances, evaporating the solvent and thereby leaving the medium partially penetrated by the standard oily substance; dissolving a test oily substance to be measured in volatile liquid of a low degree of viscosity, introducing the test solution into a duplicate medium, evaporating the solvent and thereby leaving the medium partially penetrated by the test oily substance; and transmitting light through the media for photometrically measuring the comparative translucencies of the media.

19. The method of determining the unctuousness of oily substances which comprises dissolving a predetermined amount of a standard oily substance in a volatile liquid of a low degree of viscosity, introducing the standard solution into a porous medium permeable to oily substances evaporating the solvent and thereby leaving the medium partially penetrated by the standard oily substance; dissolving an identical amount of a test oily substance to be measured in a volatile liquid of a low degree of viscosity; introducing the test solution into a duplicate medium, evaporating the solvent and thereby leaving the medium partially penetrated by the test oily substance; and transmitting light through the media for photometrically measuring the comparative translucencies of the media.

In witness that I claim the foregoing I have hereunto subscribed my name this 29th day of October, 1929.

SIEGFRIED FISCHER, Jr.